(12) United States Patent
Burde

(10) Patent No.: US 10,929,276 B2
(45) Date of Patent: Feb. 23, 2021

(54) SIMULATION COMPUTING SERVICES FOR TESTING APPLICATION FUNCTIONALITIES

(71) Applicant: PAYPAL, INC., San Jose, CA (US)

(72) Inventor: Hitendra Manohar Burde, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/442,350

(22) Filed: Jun. 14, 2019

(65) Prior Publication Data

US 2020/0394122 A1 Dec. 17, 2020

(51) Int. Cl.
| | |
|---|---|
| G06F 9/44 | (2018.01) |
| G06F 11/36 | (2006.01) |
| G06F 9/54 | (2006.01) |
| G06F 11/07 | (2006.01) |

(52) U.S. Cl.
CPC .......... *G06F 11/3664* (2013.01); *G06F 9/547* (2013.01); *G06F 11/0793* (2013.01); *G06F 11/3636* (2013.01); *G06F 11/3692* (2013.01)

(58) Field of Classification Search
CPC .................................................. G06F 11/3664
USPC ......................................................... 717/135
See application file for complete search history.

(56) References Cited

U.S. PATENT DOCUMENTS

| | | | | |
|---|---|---|---|---|
| 6,192,512 B1 * | 2/2001 | Chess | ..................... | G06F 9/455 714/38.12 |
| 7,206,732 B2 * | 4/2007 | Williams | ................ | G06F 30/33 703/22 |
| 7,478,026 B1 * | 1/2009 | Kushner | ................. | G06F 30/33 703/13 |
| 8,006,232 B1 * | 8/2011 | Rideout | ............. | G06F 11/3664 709/217 |
| 8,073,671 B2 * | 12/2011 | Papaefstathiou | ...... | G06Q 10/04 703/13 |

(Continued)

OTHER PUBLICATIONS

Andrea Arcuri et al.; "Private API Access and Functional Mocking in Automated Unit Test Generation"; 10th IEEE International Conference on Software Testing, Verification and Validation; 2017 IEEE.*

(Continued)

*Primary Examiner* — Francisco J Aponte
(74) *Attorney, Agent, or Firm* — Haynes and Boone, LLP

(57) ABSTRACT

There are provided systems and methods for simulation computing services for testing application functionalities. During application development and testing a simulation service framework may be widely accessible from a service provider or other online platform that allows an application developer to test application functionalities in different environments and based on different runtime conditions. The framework may implement one or more simulation services that are generated and provided to simulate data service calls, responses, and data processing results that may be performed when an application interacts with a real online service (e.g., database, other application, or other online service that provides some data and/or data processing to an application). Application code in the application's dependencies may be changes to perform the call to the simulation service. This service may then return some result that is expected based on the service's simulated data.

20 Claims, 7 Drawing Sheets

(56) References Cited

U.S. PATENT DOCUMENTS

| | | | | |
|---|---|---|---|---|
| 8,677,327 | B2* | 3/2014 | Huang | G06F 11/3696 703/27 |
| 8,898,643 | B2* | 11/2014 | Rode | G06F 11/261 717/111 |
| 8,924,595 | B1* | 12/2014 | Joyce | G06F 11/261 710/5 |
| 9,015,685 | B2* | 4/2015 | Greiner | G06F 11/3604 717/152 |
| 9,477,584 | B2* | 10/2016 | Hong | G06F 11/3688 |
| 9,565,260 | B2* | 2/2017 | Roth | G06F 11/3442 |
| 9,594,670 | B2* | 3/2017 | Gyure | G06F 9/54 |
| 9,959,198 | B1* | 5/2018 | Jha | G06F 11/3664 |
| 9,978,084 | B1* | 5/2018 | Sharma | G06Q 30/0269 |
| 10,055,336 | B1* | 8/2018 | Hart | G06F 11/3684 |
| 10,061,687 | B2* | 8/2018 | Nagamalla | G06F 11/3648 |
| 10,140,339 | B2* | 11/2018 | El-Charif | G06F 16/9535 |
| 10,305,962 | B1* | 5/2019 | Skowronski | H04L 67/025 |
| 10,437,712 | B1* | 10/2019 | Tyler | G06F 11/3684 |
| 10,489,807 | B1* | 11/2019 | Arguelles | G06Q 30/0206 |
| 10,705,942 | B1* | 7/2020 | Jha | G06F 11/3664 |
| 10,769,045 | B1* | 9/2020 | Sharifi Mehr | G06F 21/577 |
| 2005/0080608 | A1* | 4/2005 | Burns | G06F 30/20 703/22 |
| 2006/0047483 | A1* | 3/2006 | Kafka | G06F 11/008 702/186 |
| 2007/0277158 | A1* | 11/2007 | Li | G06F 11/3684 717/135 |
| 2008/0282230 | A1* | 11/2008 | Belvin | G06F 11/3692 717/125 |
| 2013/0219368 | A1* | 8/2013 | Carteri | G06F 11/3688 717/126 |
| 2016/0342499 | A1* | 11/2016 | Cheng | G06F 11/3664 |
| 2017/0046253 | A1* | 2/2017 | Ganda | G06F 11/3692 |
| 2017/0109260 | A1* | 4/2017 | Wang | G06F 11/3684 |
| 2018/0129592 | A1* | 5/2018 | Li | G06F 11/3684 |
| 2018/0285236 | A1* | 10/2018 | Myrand-Lapierre | G06F 30/20 |
| 2019/0278637 | A1* | 9/2019 | Sukhija | G06F 9/542 |
| 2020/0026854 | A1* | 1/2020 | Guo | G06F 21/561 |
| 2020/0159648 | A1* | 5/2020 | Ghare | G06F 11/3457 |
| 2020/0167686 | A1* | 5/2020 | Mallya Kasaragod | B25J 9/1671 |
| 2020/0167687 | A1* | 5/2020 | Genc | B25J 9/1671 |

OTHER PUBLICATIONS

Michael Anderson; "Performance Modelling of Reactive Web Applications Using Trace Data from Automated Testing"; Thesis—B. Eng., University of Victoria, 2019.*

* cited by examiner

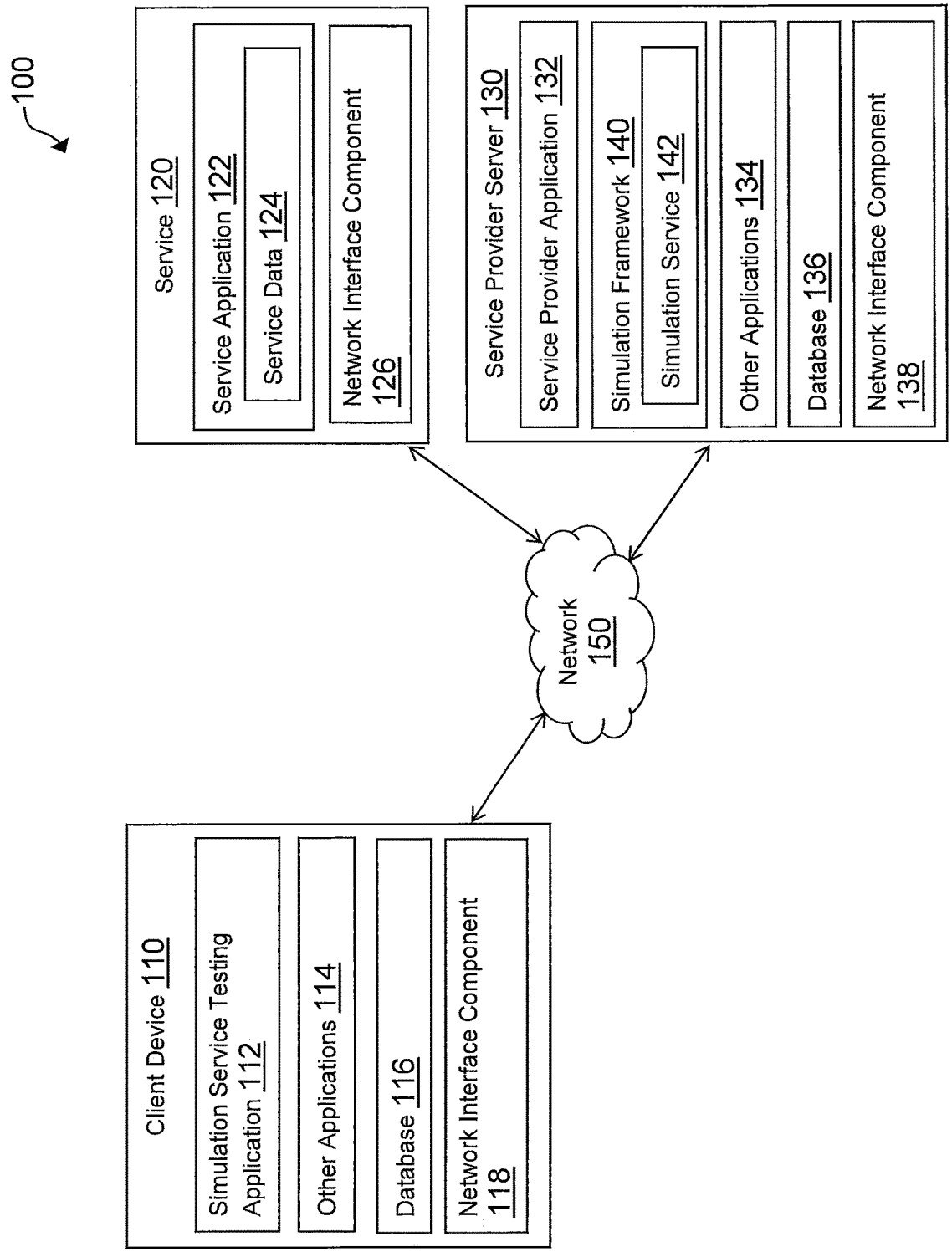

| Scenario 1200 | AM Response 1202 | OBS Response 1202 | ULC Response 1202 | Rules Decision 1208 | Overall Eligibility Response 1210 |
|---|---|---|---|---|---|
| Test 1212 | 200 OK 1214 | 200 OK 1216 | 200 OK 1218 | Approve 1220 | 200 OK 2222 |

FIG. 2C

SIMULATION COMPUTING SERVICES FOR TESTING APPLICATION FUNCTIONALITIES

TECHNICAL FIELD

The present application generally relates to application testing using simulated data services, and more specifically to an application testing framework that implements simulation computing services.

BACKGROUND

Users may utilize computing devices to perform various actions, including use of applications from service providers that perform various processes and provide functionalities to users. For example, device applications may allow a user to request, receive, and process data from different services, such as a request for accessing an account and viewing account data, electronically processing a transaction with another device or online platform, and/or requesting data stored in a database. When developing applications, developers may wish to test the application and application functionalities in different environments and under different conditions. In this regard, applications may function differently under different stresses or during different times, such as high application processing loads, high server side or service processing loads and/or requests, or other stressors on the application or application system (e.g., hardware and/or software). However, testing these application functionalities with live services may be undesirable, may not provide proper or expected results to determine if the application functionality is stable or correct, and/or may cause unwanted strain on the service that is being called by the application during testing.

BRIEF DESCRIPTION OF THE DRAWINGS

FIG. 1 is a block diagram of a networked system suitable for implementing the processes described herein, according to an embodiment;

FIG. 2C is a block diagram of exemplary test execution responses and results from a simulated service, according to an embodiment;

Figure 2A:
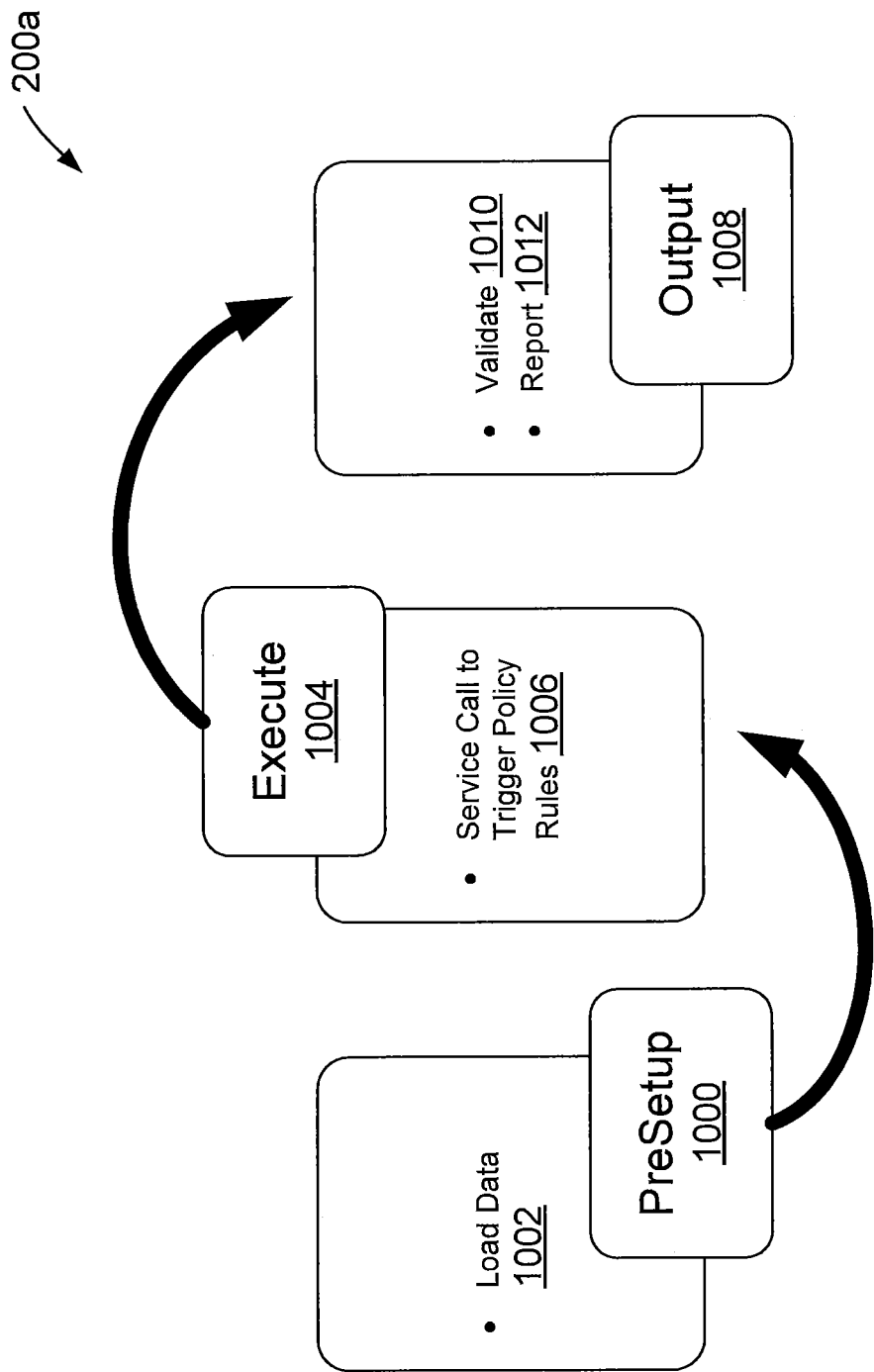
FIG. 2A is a block diagram of an exemplary test execution framework for testing application functionalities through simulated services, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for simulation computing services for testing application functionalities. Systems suitable for practicing methods of the present disclosure are also provided.

A user may utilize an application on a computing device to interact with other data services to perform data retrieval, processing, and other service processes, such as online services provided by an online service provider system to perform data processing. This may include accessing and/or authenticating use of an account, performing electronic transaction processing, or otherwise utilizing the data processing services provided by the service provider. During interactions with a service provider, many different actions may be taken, and application programming interfaces (APIs) of different services may be called. For example, multiple APIs may require risk calls, database calls and/or writes, processing calls for electronic transactions, planning calls, execution calls, or other service calls. Thus, data services may provide responses, data processing results, and other data within an application when called by the application, such as when the service receives an API call having some process or request for execution (e.g., through executable code). Data returned in an application may correspond to a payload for display or processing by the application. The data may therefore correspond to blocks of transmitted data for data processing by the system.

When developing an application, updating an existing application, or implementing new application functions in the existing application, application developers, coders, administrators, and/or risk analysis reviewers may wish to test an application's functionality and/or data service call for how the application behaves when performing the call to the service, for example, in different environments and/or under different conditions, such as high server processing loads and/or based on different responses by the called service. In order to do this, a service provider or other application testing platform may provide a widely accessible framework to test the application through the use of generated and/or provided simulation services that simulate a real data service and return results or other data as desired by the application tester and in order to simulate the real data service. In this regard, a simulation service may be generated to mimic or simulate a real data service that may be called through an API call or request made through an API interaction between the application and the data service.

The simulation service may correspond to some data repository, database, platform, processing stack, application, or other simulated data service that returns a data response and/or result based on the API call by the application. Thus, the simulation service provides the data that is desired by an application tester (e.g., a beta tester during an application beta testing phase). The simulation service provides the response so that the tester may view how the data behaves in the application under different scenarios, conditions, or environments. The simulation service may be used to test changes to a user interface (UI) and how changes to the UI affect output of data from the real service corresponding to the simulation service within the UI. The simulation service may also correspond to an account database and/or account service so that tests in a simulation framework environment may display how accounts behave, are accessed, and/or used to process data within the application. Other types of services that may also be simulated include simulated databases that return data from table lookups, caching systems to return or read cached data using a key, or other types of application data that may be returned. The simulation service may allow the tester to view application response times and errors so that the tester and/or application coder may change the application as necessary. The simulated service may be generated with an endpoint identifier used to call or transmit API calls from the application to the simulation service. For example, a simulation service identifier may be used to direct the application to the simulation service.

In order to test a risk analysis of an application, the simulation service application testing framework may allow for the application code to be opened and modified for the application. The framework may allow for application dependencies on the outside services to be edited and changed. For example, the application dependencies may correspond to all services that are called and data is provided to the application for processing. The framework may therefore allow the application to instead be directed to a simulation endpoint for the simulation service instead of the original real or live service that was to be called. The framework may therefore change an identifier in the application configuration page or code for the application dependencies from the original service to the simulated service. The application may be loaded into the framework with a service provider or other online or device side platform, which allows for changing of the application dependencies on outside services to the simulated services with the framework. These simulated services may be generally generated for different applications depending on application service needs or may be generated through the framework specifically for an application tested by a tester.

The application testing framework that provides application testing through simulated services may be generated to reside on a widely available platform, such as an online service provider's platform. The online service provider may provide one or more servers and/or devices to provide access to the framework, including a cloud computing architecture that may be accessed by testing devices and application testers. The application testers may therefore access the framework through a device (and from the service provider) and load an application into the framework for testing. After changing application dependencies, the tester may then execute the application and/or process for testing, and execute a test use of the application, such as request application processing, use of functionalities, and the like. The application may then perform a call to the simulated service, which may return the resulting data and/or response set for the simulation service. The application may therefore perform an API call to an API of the simulation service (e.g., through an application API and interface with the simulation service), which may correspond to or simulate the real services API. The simulation service then returns the result to the application, which outputs the data within the application and/or provides the data in the application so that the tester may view the results of the service call.

Multiple tests of the same or different service calls may be executed by the framework. This allows the tester to view the results in different environments or conditions. Additionally, the tester may implement different conditions or environments on the test of the application. For example, the framework may test a server-side application or an application that interacts with a server during high server processing load. The framework may also provide for high network traffic and/or communication pathway traffic associated with the device/server executing the application, for example, during high traffic of service calls to the service or with the device/server's communication pathway(s) used by the application or device/server. Other types of conditions, limitations, or processing loads may also be implemented. Once the tests are performed and/or completed, the results may be output to the tester and/or stored in a data repository, such as a database of the service provider, so that the results may later be accessed and reviewed.

Thus, the results or responses from the service may be used to determine how the application reacts or outputs data when performing a service call for data to the service. The framework allows for the tester to put different stresses on the application and view application responses. The framework allows the tester to identify gaps in the application and what causes specific application results or experiences. The tester may view if the data is properly loaded from the service to the application. Additionally, if the service goes down, a simulation service may be used to mimic a service down experience by the application and view the application results. A status code and a response may be returned to the application based on that data established with the simulation service, which may be reviewed by the tester. Risk analysis may also be performed and provided to show application risk and performance based on failure to contact a service and/or receive service data, application failure, application slow down (e.g., due to network traffic or processing loads), or application vulnerabilities caused by these issues. This may include application response times, errors, and other issues or vulnerabilities.

In this manner, a service provider may provide application testing that allows identification and troubleshooting of application issues that arise in different computing environments, stresses, and/or conditions. The framework may be widely available from an online service provider so that many applications may be tested in many environments and from disparate client computing devices and systems. This allows application coders and testers to prevent or minimize application errors, slowdown, and vulnerabilities during runtime and use by other users so that user experiences are improved and not hindered by these application errors. Utilizing simulation services provides increased application functionality testing and improves testing speeds and availability while not using up network communication and processing resources of live real services. Additionally, the simulation service framework and services utilize the same API of the application and simulated APIs of the services so that minimal application changes are required. Additionally, the identification of and troubleshooting of application errors limits wasted resources due to errors in data processing, transmission, and/or translation between distributed processing stacks. Thus, the framework provides improved testing resources to different client device systems.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, a service 120, and a service provider server 130 in communication over a network 150. A user (not shown) may utilize client device 110 to utilize the various features available for client device 110, which may include processes and/or applications that may interact with services provided by service 120 and/or service provider server 130 to process data. Service provider server 130 may provide an application testing framework through use of simulation services, such as a simulation service that simulates service 120 and returns status codes and data similar to how service 120 may respond to an application based on a service call to service 120 by the application. Client device 110 may be used to access the testing framework and load an application to the framework for testing. The framework may change the application dependencies for called services, such as one or more identifiers used to contact service 120 for data. The framework may change the identifier(s) to the simulation service with service provider server 130. The framework may then execute one or more service calls during testing of the application to the simulation service.

Client device 110, service 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a computing or communication device that may utilize appropriate hardware and software configured for wired and/or wireless communication with service provider server 130, which may include personal and mobile computing devices of individual and/or groups of customers of service provider server 130, such as single users, merchants, and/or other entities. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains a simulation service testing application 112, other applications 114, a database 116, and a network interface component 118. Simulation service testing application 112 and other applications 114 may correspond to executable processes, procedures, and/or applications with associated hardware. In other embodiments, client device 110 may include additional or different modules having specialized hardware and/or software as required.

Simulation service testing application 112 may correspond to one or more processes to execute software modules and associated devices of client device 110 to send, receive, and/or process data with service provider server 130 to facilitate testing of an application through an application testing framework using simulation services provided by service provider server 130. In this regard, simulation service testing application 112 may correspond to specialized hardware and/or software utilized by a user of client device 110 to first access the framework, which may include utilizing an application to download the framework, access the framework on service provider server and send/receive data with the framework, or otherwise use the framework provided by service provider server 130. Once accessed and running, simulation service testing application 112 may then provide or execute an application within the application testing framework so that the application may be tested when performing service calls to services for data.

When the application is tested, the application may be required to make service calls to the simulation services in place of service calls for data to real or live services. Simulation service testing application 112 may be used to access and/or view information for the simulation services provided by the framework such that the simulation services may be identified and service calls from the application may be properly routed to the simulation service. Simulation service testing application 112 may therefore be used to select simulation services and add those simulation services to the application dependencies list, table, or code for the application. This may include replacing an identifier for the real or live service in the code with an identifier for the simulation service so that API calls or other data requests may be made to the simulation service. In some embodiments, simulation service testing application 112 may be used to generate and/or modify simulation services, for example, by providing identifiers used for service calls, service response data, and/or status identifiers associated with the simulation service returning the data within an application. One or more user interfaces may be provided by simulation service testing application 112 so that the dependencies in the application may be changed, for example, by providing an application configuration interface or page for changing application configurations and dependencies on services for the application. Simulation service testing application 112 may then be used to run or request an application test of functionalities, where the test calls the simulation services. Thereafter, simulation service testing application 112 may be used to output a response within an interface based on the call to the simulation service, which may display the response in the application from the simulation service, the status identifier, and/or other information necessary to see application functionality, results, success, or failure depending on the conditions of the test.

In various embodiments, client device 110 also includes other applications 114 as may be desired in particular embodiments to provide features to client device 110. For example, other applications 114 may include security applications for implementing client-side security features, programmatic client applications for interfacing with appropriate application programming interfaces (APIs) over network 150, or other types of applications. Other applications 114 may also include additional communication applications, such as email, texting, voice, social networking, and IM applications that allow a user to send and receive emails, calls, texts, and other notifications through network 150. Other applications 114 may be utilized with simulation service testing application 112 to test one or more of other application 114 and/or identify or generate simulation services. Other applications 114 may include device interfaces and other display modules that may receive input and/or output information. For example, other applications 114 may contain software programs, executable by a processor, including a graphical user interface (GUI) configured to provide an interface to the user.

Client device 110 may further include database 116 stored in a transitory and/or non-transitory memory of client device 110, which may store various applications and data and be utilized during execution of various modules of client device 110. Thus, database 116 may include, for example, identifiers (IDs) such as operating system registry entries, cookies associated with voice data application 120 and/or other applications 114, IDs associated with hardware of client device 110, or other appropriate IDs, such as IDs used for payment account/user/device authentication or identification. Database 116 may further include applications for testing, application testing framework components and/or processes for client device 110, simulation service identifiers and information, and/or application testing results for viewing.

Client device 110 includes at least one network interface component 118 adapted to communicate with service 120 and/or service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 118 may communicate directly with nearby devices using short range communications, such as Bluetooth Low Energy, LTE Direct, Wi-Fi, radio frequency, infrared, Bluetooth, and near field communications.

Service 120 may correspond to a data service, repository, and/or data processing device/server that may receive API calls from one or more applications and return data for display and/or processing within the application. In this regard, service 120 may correspond to a live, online and/or real data service that functions with applications to provide data for various application functionalities. Service 120 may be called using a service identifier so that communication by a device executing applications may call on service 120 for the data stored on, provided by, and/or generated/processed by service 120. In this regard, service 120 includes one or more processing applications which may be configured to interact with client device 110, service provider server 130, and/or another device/server to provide data within an application. In one example, service 120 may be provided by PayPal®, Inc. of San Jose, Calif., USA. However, in other embodiments, service 120 may be maintained by or include another type of service, which may provide the aforementioned data services to a plurality of users. Although only one service is shown, a plurality of services may function similarly.

Service 120 includes a service application 122 having service data 124 and a network interface component 126. Service application 122 may correspond to executable processes, procedures, and/or applications with associated hardware. In other embodiments, client device 110 may include additional or different modules having specialized hardware and/or software as required.

Service application 122 may correspond to one or more processes to execute software modules and associated devices of service 120 to receive an API call or other data request from an application executed by a device or server and respond to the data request with service data 124. In this regard, simulation service testing application 112 may correspond to specialized hardware and/or software utilized by a user of client device 110 to first receive the API or other data request. The data request from the application may include a request for data stored by service 120 and/or a data processing request to perform some operation and respond to the application with a data response include a status code of the data response and data payload for output within the application. In some embodiments, service application 122 may perform a data lookup or processing action to receive, access, and/or generate service data 124. Service application 122 may perform API interactions with the application requesting the data, and may then return the requested data as well as any necessary status codes or other information. Service application 122 may further provide additional functionalities associated with returning or responding to an application with service data 124 or other information.

Service 120 also includes at least one network interface component 126 adapted to communicate with client device 110, service provider server 130, and/or another device or server executing an application that requests data from service 120. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 126 may communicate directly with nearby devices using short range communications, such as Bluetooth Low Energy, LTE Direct, Wi-Fi, radio frequency, infrared, Bluetooth, and near field communications.

Service provider server 130 may be maintained, for example, by an online service provider, which may provide payment and other data processing features to users through implemented services of service provider server 130, and may further provide an application testing services through a framework utilizing simulation services. In this regard, service provider server 130 includes one or more processing applications which may be configured to interact with client device 110 and/or another device/server to facilitate application testing. In one example, service provider server 130 may be provided by PayPal®, Inc. of San Jose, Calif., USA. However, in other embodiments, service provider server 130 may be maintained by or include another type of service provider, which may provide the aforementioned services to a plurality of users.

Service provider server 130 of FIG. 1 includes a service provider application 132, a simulation framework 140, other applications 134, a database 136, and a network interface component 138. Service provider application 132, simulation framework 140, and other applications 134 may correspond to executable processes, procedures, and/or applications with associated hardware. In other embodiments, service provider server 130 may include additional or different modules having specialized hardware and/or software as required.

Service provider application 132 may correspond to one or more processes to execute software modules and associated specialized hardware of service provider server 130 to provide services to users for data processing, for example, when users utilizes an application to interact with one or more services, such as service 120. In some embodiments, service provider application 132 may correspond to specialized hardware and/or software to provide payment services and payment accounts through software services, which may interact with one or more auxiliary services, such as service 120. In some embodiments, service provider application 132 may allow for a payment to a user and/or merchant through a payment instrument, including a credit/debit card, banking account, payment account with service provider server 130, and/or other financial instrument. In order to establish a payment account for a user to send and receive payments, a user may generate, access, authenticate, and/or use a payment account and/or other payment services through payment instruments. The user may provide information, including user personal and/or financial information. Additionally, the information may include authentication information, such as a login, account name, password, PIN, or other account creation information. The user may provide a name, address, social security number, or other personal information necessary to establish an account and/or effectuate payments. Service provider application 132 may further allow the user to maintain the payment account, for example, by adding and removing payment instruments. In order to perform transaction processing and/or payments, service provider application 132 may receive and/or generate payment transaction data and process the data through one or more processing stacks and/or services, such as service 120. Service provider application 132 may generate a payment instruction and processing the payment instruction. Service provider application 132 may also be used to debit an account of the user and provide the payment to an account of the merchant or other user. Service provider application 132 may also be used to provide transaction histories for processed transactions. Service provider application 132 may be accessed through a device-side application or another application or a device/server. In this regard, the other application and/or service provider application 132 may be tested, for example, during a beta test phase or when implementing new features, through simulation framework 140.

Simulation framework 140 may correspond to one or more processes to execute software modules and associated specialized hardware of service provider server 130 to provide application testing through a framework that allows service calls to be made to one or more simulation services that simulation data requests, retrievals, and responses as other real or live services. In this regard, simulation framework 140 may correspond to specialized hardware and/or software to first receive a request to access and/or use the application texting framework, for example, from client device 110 over network 150. For example, the framework may be downloaded to client device 110 or an application on client device 110 may invoke and execute processes on service provider server 130 for simulation framework 140. Once simulation framework 140 is executing, an application may be opened or utilized within simulation framework 140 so that the application can be tested. Simulation framework 140 may utilize simulation service 142 in order to provide application testing.

In order to properly test the application within simulation framework 140, one or more interface may be provided that allow client device 110 to select the application, change application dependencies on other services (e.g., from service 120 to simulation service 142), execute a test, and view the application processing results and service responses. For example, an application configuration page may allow the user to change an identifier used to send and receive service calls (e.g., API calls and other data requests) from service 120 that normally would be invoked by the application to simulation service 142 that provides a specific output or response required by the user to test the application. In some embodiments, the interfaces may further allow for client device 110 or another tester or entity to generate simulation service 142 based on input and/or adjust simulation service 142 to have certain identifiers, simulated data output, or other information, such as a response code or status identifier. Simulation framework 140 may then change the application dependencies during the test and may receive a request to execute the test of the application using simulation service 142.

In response to executing the test, simulation service 142 may be called and the response to the call may be provided within the application through simulation framework 140. The user may then use the interfaces to see the results and responses within the tested application. Multiple tests may be executed in order to test application stresses and/or conditions (e.g., high device processing load, network traffic issues, and the like) that the application may encounter during execution. Simulation framework 140 may output the response data to client device 110. Additionally, simulation framework 142 may further provide troubleshooting information and/or guides in order to resolve application issues detected during application testing.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include connection and/or communication applications, which may be utilized to communicate information to over network 150.

Additionally, service provider server 130 includes database 136. As previously discussed, a user may establish one or more digital wallets and/or payment accounts with service provider server 130. Digital wallets and/or payment accounts in database 136 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 130, e.g., from client device 110, one or more digital wallets and/or payment accounts belonging to the users may be found. Database 136 may also store information for simulation framework 140, simulation service 142 and other simulated services, applications for testing and/or application identifiers, and responses from services in applications, such as application test results.

In various embodiments, service provider server 130 includes at least one network interface component 138 adapted to communicate client device 110, service 120, and/or other devices/servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is a block diagram of an exemplary test execution framework for testing application functionalities through simulated services, according to an embodiment. Environment 200a of FIG. 2A includes exemplary steps of a test execution framework that allows application testing through simulation services. In this regard, the steps of environment 200a may be performed using a framework that tests applications through simulation services, such as simulation framework 140 using simulation service 142 in system 100 of FIG. 1.

In an initial pre-setup phase 1000, the framework is executed or opened to perform data loading at a load data phase 1002. The load data phase 1002 allows a user to load application data into the framework, as well as allow the user to view and change application dependencies on external services. For example, the load data phase 1002 allows the user to select simulation service(s) for service calls, where the simulation service(s) mirror or simulate real or live services normally used by the application during data retrieval and processing. The load data phase may therefore allow the user to change identifiers for the services in the application dependencies to the simulation services. Once changed, the application may perform API calls and other data requests to the simulation services. Additionally, in the load data phase 1002, data may be loaded to one or more services so that the payload of the returned data may be provided in the application.

After loading of the data, an execute phase 1004 may be performed by the application testing framework. The execute phase allows for the application testing framework to execute one or more processes of the application that requests data from a service. The requested data may correspond to data available, processed, or generated by the service. However, since the application dependencies now include identifiers for the simulation service(s), the execute phase 1004 may include performing service calls to the simulation services that trigger policy rules at a service call phase 1006. These service calls performed by the application to the simulation services at the service call phase 1006 may cause the simulation service to respond with data, a status identifier or code, or other response information that may then be output within the application and/or processed by the application. Additionally, certain conditions or environments may be imposed on the application at the service call phase 1006 to determine how the application reacts during those conditions.

At an output phase 1008, results of application testing using the framework may then be output to users. For example, a validate phase 1010 may validate the responses from the simulation services as well as the application performance, reaction, data processing, and/or data display based on the responses from the simulation services. The validate phase 1010 may be used to determine how the application responds to the simulation services and identify any gaps or issues in performance based on the simulation service responses and the conditions imposed on the test. Further, a report phase 1012 allows for reporting of the information from the validate phase 1010. The report phase 1012 may display the information through one or more interfaces, and may further include storing the information in a repository so that test results may be stored, cataloged, and/or organized for review.

Figure 2B:
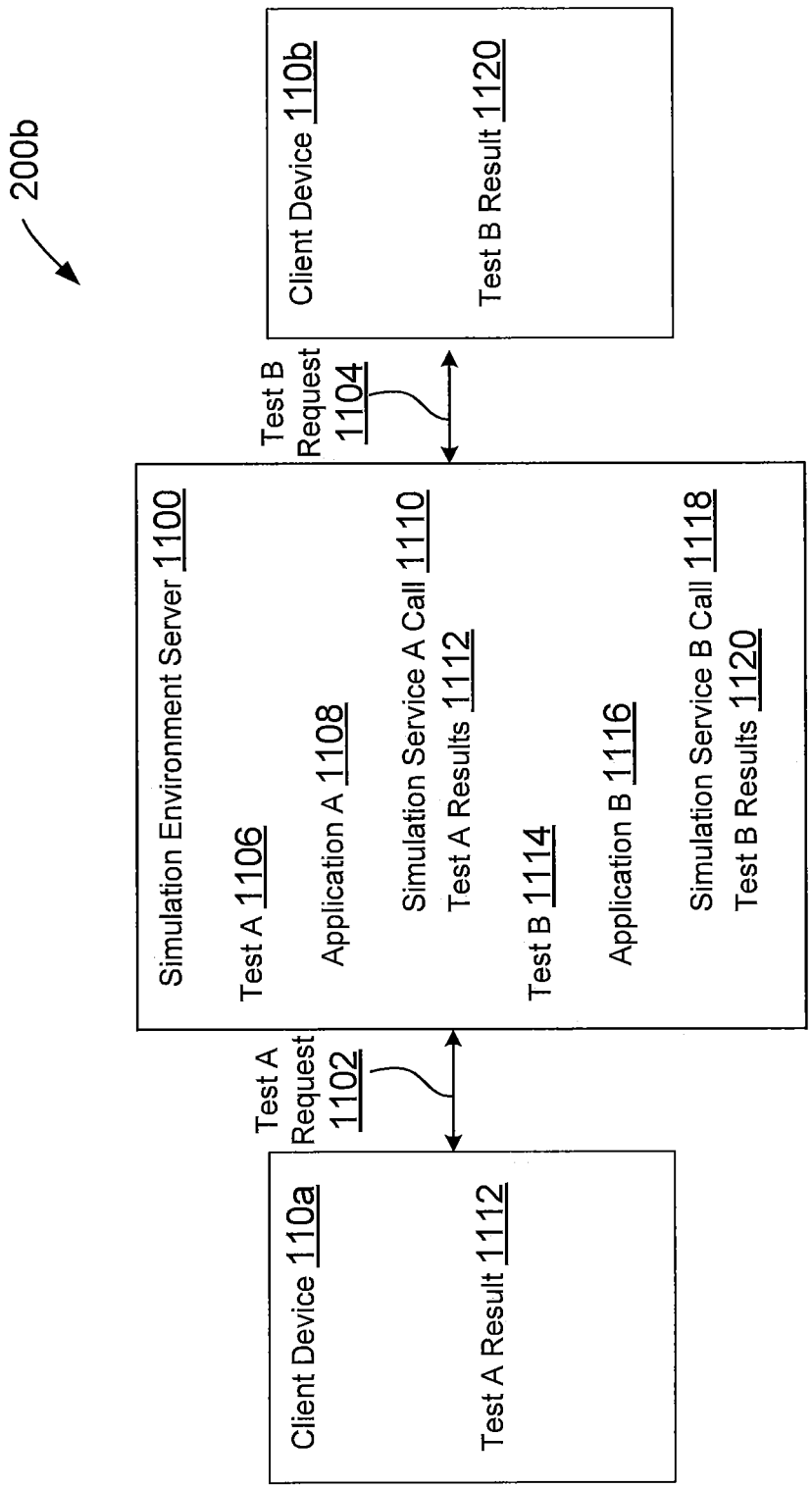
FIG. 2B is a block diagram of an exemplary system environment for testing applications in a single environment from a widely accessible framework, according to an embodiment.

FIG. 2B is a block diagram of an exemplary system environment for testing applications in a single environment from a widely accessible framework, according to an embodiment. Environment 200b of FIG. 2B includes devices that may be interacted with to provide and use a widely accessible framework to test applications through simulation services. In this regard, the devices shown in environment 200b may correspond to those in system 100 of FIG. 1. For example, a client device 110a and a client device 110b may correspond to client device 110 and simulation environment server 1100 may correspond to service provider server 130 in system 100.

Environment 200b displays how client devices 110a and 110b may each access simulation environment server 1100 to run a test using a simulation framework that provides application testing using simulation services. Multiple devices may access simulation environment server 1100 from different locations over a network so that application testing may be performed on many different applications from many locations, which provides wide accessibility to application testing and allows for robust testing using available simulation services. Client device 110a may therefore transmit a test A request 1102 to simulation environment server 1100 and client device 110b may transmit a test B request 1104 to simulation environment server 1100. This may occur concurrently or at different times and may further test the same application or different applications using the same or different simulation services. Test A request 1102 and test B request 1104 include identification of simulation services for application testing, and allow the framework to edit, code, or otherwise adjust the application to have application service dependencies changed to the simulation services.

In response to test A request 1102, a test A 1106 is generated using a framework provided by simulation environment server 1100. Similarly, a test B 1114 is generated based on test B request 1104 by simulation environment server 1100. Simulation environment server 1100 therefore allows multiple tests to be run in a single environment, wherein test A 1106 and test B 1114 may be executed on the same or different application that may be posted on any device or server, including local or remote devices/servers. When executing test A 1106, application A 1108 may be executed in the simulation environment. Test A 1106 may perform simulation service A call 1110 and receive a response from a simulation service A. This response may include test A results 1112 to simulation service A call 1110, such as a data payload output in an application and performance of the application.

Similarly, test B 1113 may be performed on an application B 1116. Both application A 1108 and application B 1116 may be locally stored, opened, and executed by simulation environment server 110 or may be accessed and tested from a remote device or server. Test B 1114 may perform simulation service B call 1118 for data from a simulation service B. Test B then results in test B results 1120 showing the application output and processing from simulation service B in application B 1116. Test A results 1112 and test B results 1120 may be output on client device 110a and client device 110b, for example, through a user interface. In further embodiments, test A results 1112 and test B results 1120 may be stored in a database or other repository for organizing and storing the results.

FIG. 2C is a block diagram of exemplary test execution responses and results from a simulated service, according to an embodiment. Table 200c of FIG. 2C displays a table of response data and output after a test using a simulation framework environment provided by a service provider server or other device/server, such as service provider server 130 in system 100 of FIG. 1. Table 200c is shown with various data, responses, and status codes for responses.

Table 200c may therefore result from a simulation framework test of an application using simulation services meant to mimic or imitate a real live service and return a data response to an application for output and/or processing. Table 200c includes a scenario 1200 for a test 1212. Scenario 1200 may correspond to different application tests that execute or test different features and processes of the application. For example, test 1212 that is performed for scenario 1200 may correspond to an existing account for an account number passed between the application and a service provider, an non-existing account determination (e.g., no account in a storage database), an invalid security context or validation error, an internal service down error, a no pending application, a pending offer selection, a pending funding, a pending manual remediation requirement, or other type of test and condition imposed on testing the application's interaction with a service and response to a service call in the application.

In response to test 1212, different response codes and decision rules may be output. For example, an account management service (AM) response 1202 may display a response from an AM, an onboarding service (OBS) response 1204 may display a result from an OBS, and a user lifecycle service (ULC) response 1206 may display a response from a ULC. Each of these services correspond to a service used by the application to retrieve and output data, and therefore a simulation service is generated for each of these services. These responses may correspond to status or response codes. For example, responses 1214, 1216, and 1218 for AM response 1202, OBS response 1204, and ULC response 1206, respectively, show a status code of 200 OK. Rules decision 1208 includes a rule decision based on the responses from the services, which is displayed as an approve decision 1220. Additionally, an overall eligibility response 1210 further includes a status code for a response 2222, shown as 200 OK.

Figure 3:
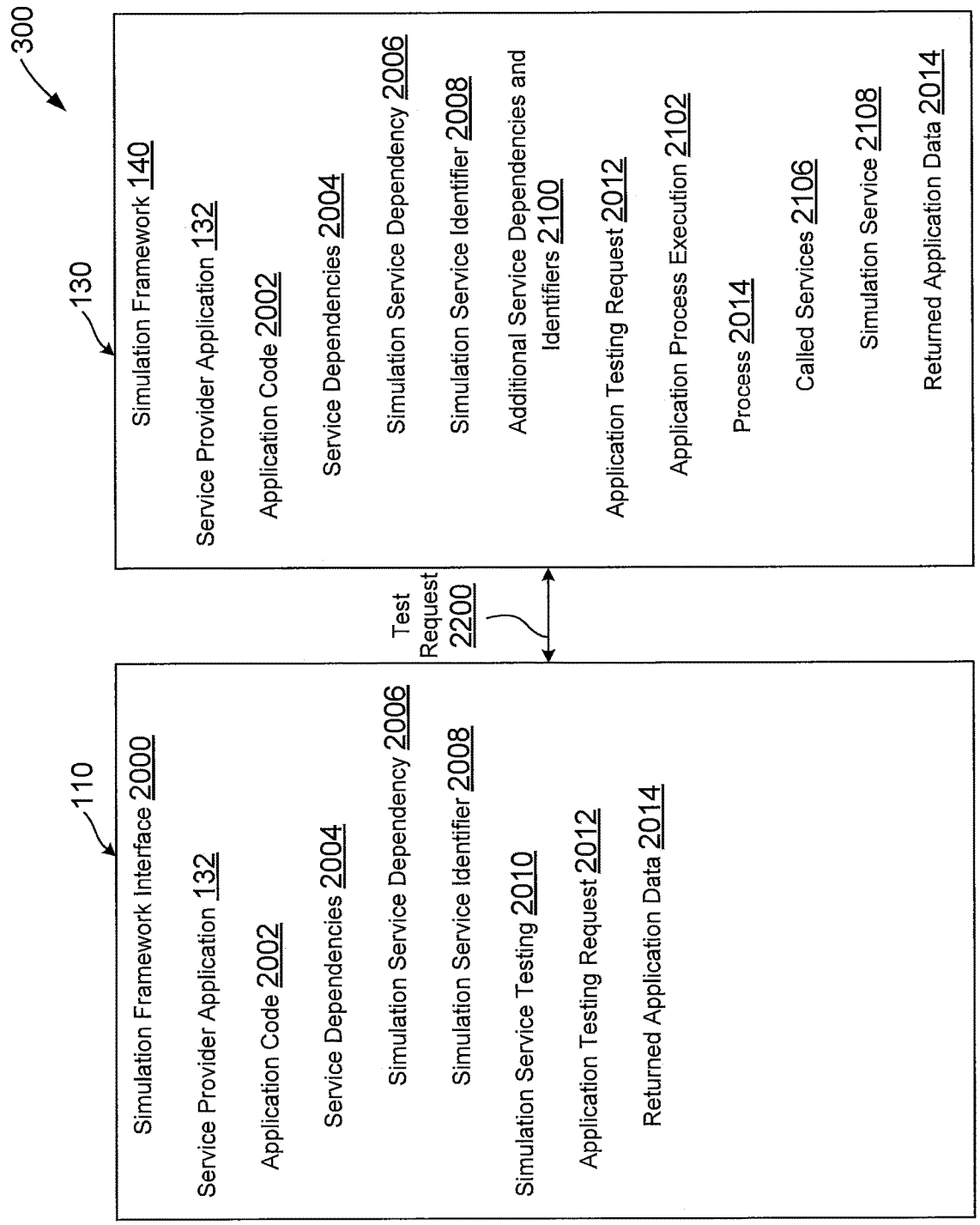
FIG. 3 is a block diagram of an exemplary client device interacting with a service provider server for application testing using simulation services, according to an embodiment.

FIG. 3 is a block diagram of an exemplary client device interacting with a service provider server for application testing using simulation services, according to an embodiment. Environment 300 includes client device 110 and service provider server 130 discussed in reference to system 100 of FIG. 1. Thus, client device 110 and service provider server 130 interact to perform application testing using the various processes and features discussed in reference to system 100. This may then be utilized to perform application testing through a process or flowchart, as discussed in reference to FIG. 4.

Client device 110 displays a simulation framework interface 2000, which may be output by an application accessing and/or utilizing a simulation framework available with service provider server 130, such as service provider application 132. Service provider application 132 may therefore test an application by identifying the application and adjusting application code 2002 so that the application's service dependencies 2004 are adjusted from identifying a real or live service that normally returns data to a simulation service dependency 2006 using a simulation service identifier. This allows client device 110 to issue a test request 2200 to service provider server 130 based on simulation service testing 2010. For example, application testing request 2012 may include identification of the scenario or test, conditions for the test, and simulation service identifier 2008, which causes test request 2200 to be transmitted to service provider server 130.

Service provider server 130 therefore provides a simulation framework 130, which may be used to test an application. For example, in environment 300, simulation framework 140 tests service provider application 132 used by client device 110 and other devices to access and process data from services provided or used by service provider server 130, for example, account and transaction processing services. Thus, service provider application 132 includes application code 2002 that is adjusted based on test request 2200 so that service dependencies 2004 are changed so that simulation service dependency 2006 includes simulation service identifier 2008 for service calls. Application code 2002 further includes additional service dependencies and identifiers 2100 for other services that are called for data by the application. In response to application testing request 2012 transmitted through test request 2200, simulation framework 140 performs an application process execution 2102 on a process 2014. Called services 2106 for process 2014 performs a service call to simulation service 2108, and provides returned application data 2014 for the service call, which may be output to client device 110.

Figure 4:
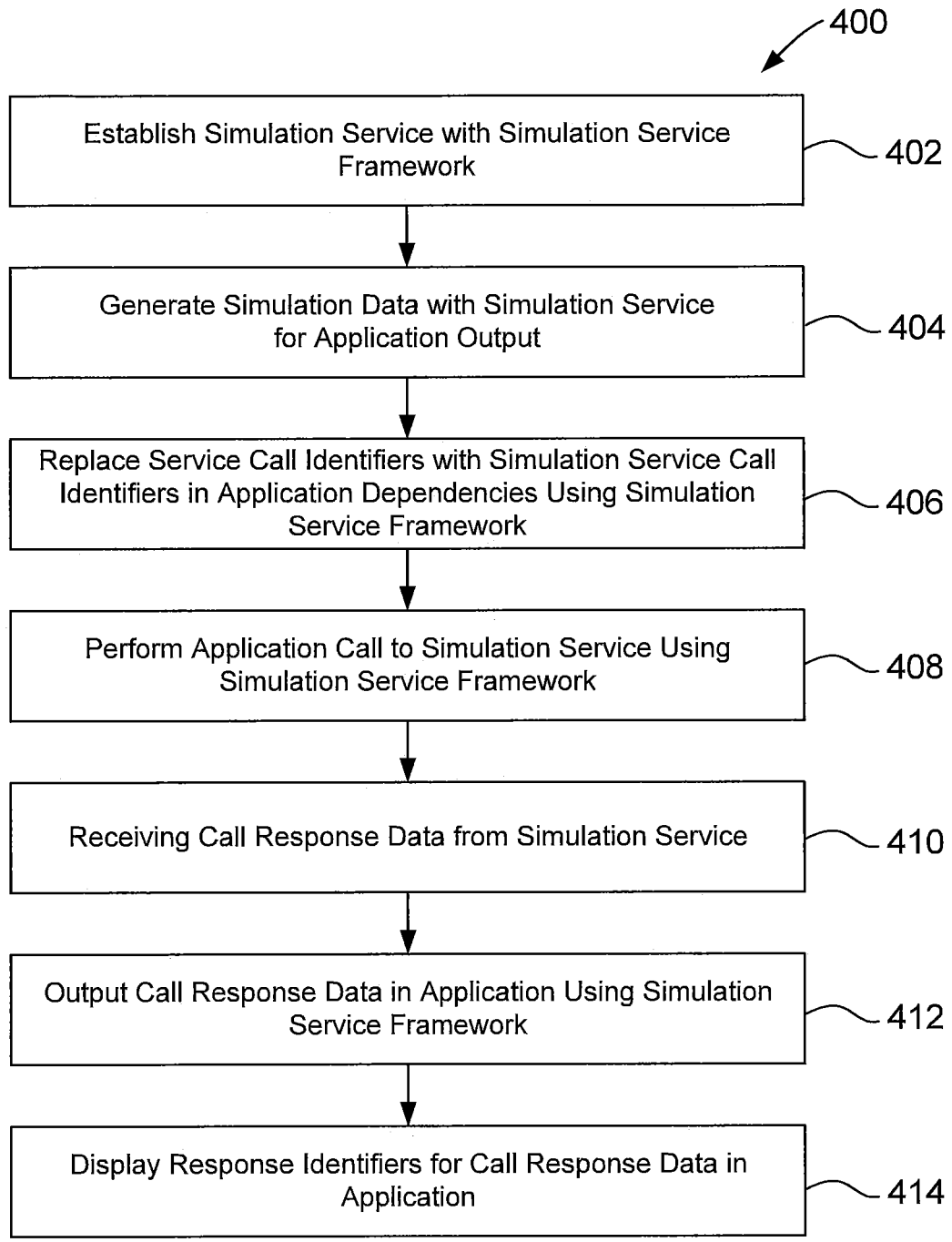
FIG. 4 is a flowchart of an exemplary process for simulation computing services for testing application functionalities, according to an embodiment.

FIG. 4 is a flowchart 400 of an exemplary process for simulation computing services for testing application functionalities, according to an embodiment. Note that one or more steps, processes, and methods described herein of flowchart 400 may be omitted, performed in a different sequence, or combined as desired or appropriate.

At step 402 of flowchart 400, a simulation service with a simulation service framework is established, for example, based on a real live service that normally would return data to an application during application performance and/or processing. The simulation service may be generated with an identifier for calling the simulation service, such as through an API call or other data request. At step 404, simulation data with the simulation service for application output is generated. The simulation service may therefore be generated to have a data response or payload for returning within the application for display or processing. The data may correspond to user interface data that may be displayed in one or more graphical user interfaces (GUIs). Additionally, the simulation service may include a status code to return to the application. Thus, the simulation service may have expected data output by the application when being called by the application during an application process.

Thereafter, to perform application testing, service call identifiers are replaced with simulation service call identifiers in application dependencies, for example, using the simulation service framework. The framework may provide an application configuration page or interface that allows the user to select different simulation services, which then cause the code of the application to be changed so that the application calls the simulation service in place of the real or live service. The framework therefore allows changes to the application code to be made and/or reversed so that application testing may occur using simulation services. After testing, the framework may reverse the code changes so that the application once again calls the correct service and returns data from the real or live service as the application would normally function. An application call to the simulation service is then performed using the simulation service framework, at step 408, for example, based on the simulation service identifiers changed in the application dependencies during step 406. The application call may be placed to the simulation service based on a test of the application and/or application processes using the framework. The application call may correspond to an API call or other data request to the simulation service that leverages the application's present API and utilizes an API of the simulation service that is modeled the same or similar the real live service.

At step 410, call response data is received from the simulation service in response to the application call to the simulation service. The call response data may correspond to the data with the simulation service that is returned to the application based on the service call, as well as any associated data such as status identifiers generated or provided based on the call and/or returned data. Additionally, other data, such as application diagnostics and/or performance during the service call or in response to the service call may be determined and returned. Thus, at step 412, call response data is output in the application using the simulation service framework. This allows a user, such as a tester, to view the results of the service call to the simulation service and determine if there are any errors or issues in application service call processing or performance. This output data may be dependent on the conditions imposed on the application and/or device executing the application with the testing framework. The other issues in performance or operation of the application based on the service call may also be displayed. Response identifiers, such as status codes, are displayed for the call response data in the application, at step 414. This allows for reviewing of any status identifiers or codes for application responses based on the output of the response data within the application. The framework may then conclude by exiting or closing the application, as well as returning any service identifiers for simulation services back to the real live service's identifiers used for service calls.

Figure 5:
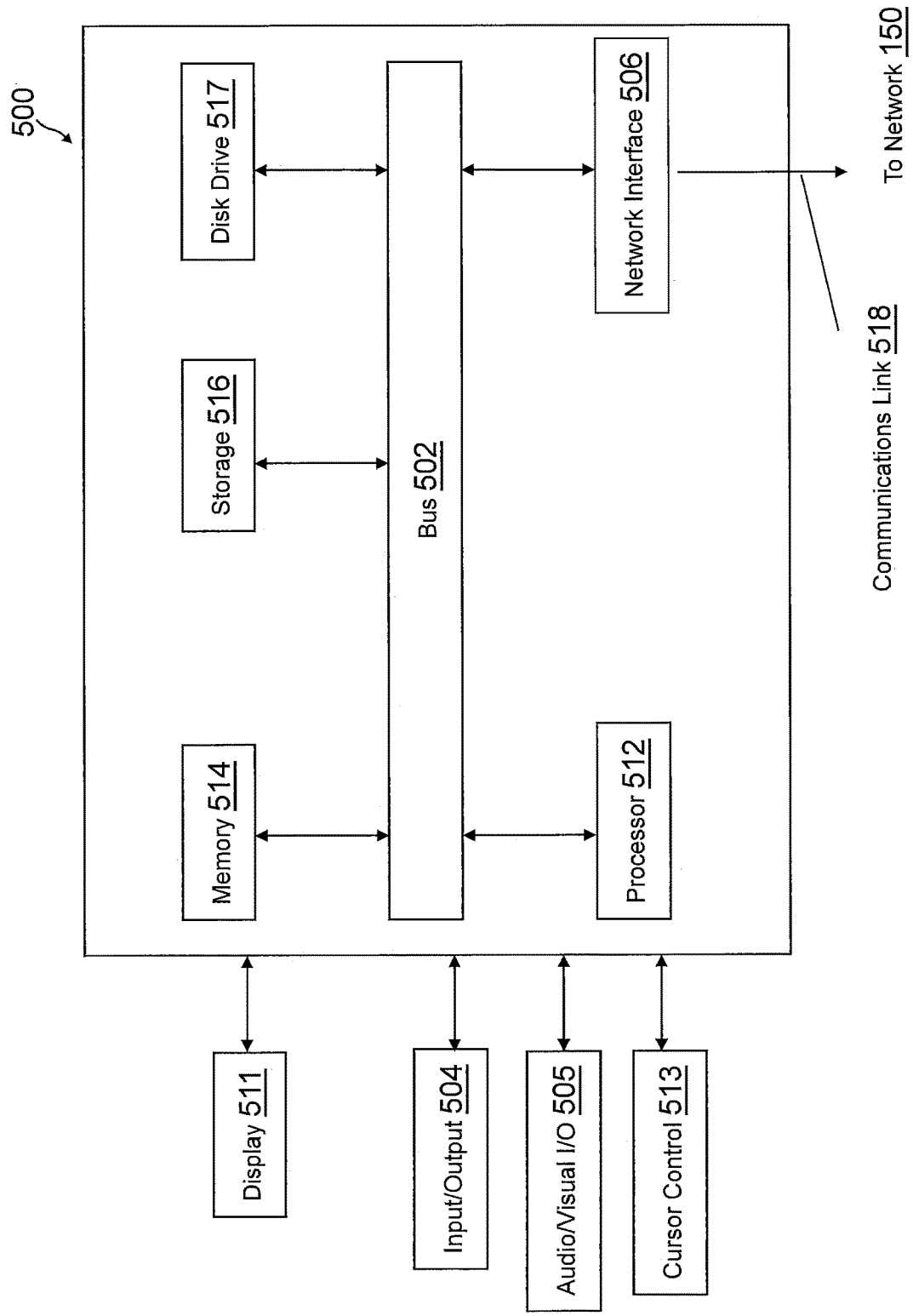
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors coupled to the non-transitory memory and configured to read the instructions from the non-transitory memory to cause the system to perform operations comprising:
executing an application in a simulation service framework, wherein the simulation service framework includes a simulation service having simulation data accessible through application programming interface (API) calls to the simulation service;
receiving a first application request for a first API call to the simulation service through the simulation service framework, wherein the first API call comprises a data request from the application for the simulation data;
performing the first API call to the simulation service in the simulation service framework based on the first application request;
determining a first response to the first API call based on the simulation data;
providing the first response to the first API call using the simulation service framework to the application;
replacing, using the simulation service framework, an identifier for a computing service with a simulation identifier for the simulation service in application dependencies code of the application, wherein an execution of the application dependencies code enables a second API call to the simulation service;
performing the second API call to the simulation service in response to the execution;
determining a second response to the second API call from the simulation service, wherein the second response is associated with the simulation data for the simulation service; and
providing the second response for the application in a user interface of the simulation service framework.

2. The system of claim 1, wherein the operations further comprise:
providing application behavior data associated with operational behavior of the application during a processing load based on the first response and the second response in the user interface of the simulation service framework.

3. The system of claim 2, wherein the application behavior data comprises risk assessment data associated with an application failure during the processing load.

4. The system of claim 3, wherein the operations further comprise:
tracking the risk assessment data over a series of application tests based on the first response and the second response.

5. The system of claim 3, wherein the operations further comprise:
providing the application behavior data or the risk assessment data in the user interface of the simulation service framework.

6. The system of claim 1, wherein the providing the first response comprises providing user interface data for the application having the simulation data in the user interface data.

7. The system of claim 6, wherein the user interface data comprises a test user interface of the application that displays the simulation data within the application.

8. The system of claim 1, wherein the simulation data comprises a simulated service response to an operation associated with the data request within the application that mimics a service response to one of an internal service or an external service that provides data within the application based on the data request.

9. The system of claim 1, wherein prior to receiving the first application request for the first API call, the operations further comprise:
directing the application to the simulation service in an application configuration page associated with the application.

10. The system of claim 1, wherein the performing the first API call to the simulation service comprises connecting the application to a service endpoint for the simulation service and fetching the simulation data through the connecting.

11. A method comprising:
replacing, using a simulation service framework, a service identifier for a data provider service in application code for an application with a simulation service identifier for a simulation data provider service;
performing, through the simulation service framework, an application programming interface (API) call from the application to the simulation data provider service based on an application process associated with the data provider service;
determining, by the simulation service framework, response data from the simulation data provider service to the API call based on simulation data with the simulation data provider service;
providing, using the simulation service framework, the response data to the application;
replacing, using the simulation service framework, the service identifier for the data service provider with the simulation service identifier for the simulation data provider service in additional application code of an additional application;
performing an additional API call to the simulation data provider service using the additional application code of the additional application;
determining additional response data to the additional API call from the simulation data provider service, wherein the additional response data is associated with the simulation data for the simulation data provider service; and
providing the additional response data to the additional application.

12. The method of claim 11, further comprising:
storing the response data in a database, wherein the database includes monitoring application behavior data of the application associated with the response data.

13. The method of claim 11, further comprising:
providing an application response based on the response data in a user interface of the simulation service framework.

14. The method of claim 11, wherein the response data comprises one of a user interface (UI) display response to the simulation data in the application or a transaction processing result to the simulation data.

15. The method of claim 11, further comprising:
providing troubleshooting information associated with the response data in a user interface of the simulation service framework, wherein the troubleshooting information comprises an operation to resolve an error associated with the response data.

16. The method of claim 11, wherein the replacing the service identifier for the data provider service comprises executing a load phase of the simulation service framework for changing of the service identifier with the simulation service identifier.

17. A system comprising:
a non-transitory memory storing instructions; and
one or more hardware processors coupled to the non-transitory memory and configured to read the instructions from the non-transitory memory to cause the system to perform operations comprising:
generating a simulation service in an application simulation service framework, wherein the simulation service includes simulation data accessible by a first application through a first application programming interface (API) call to the simulation service;
providing a simulation identifier for the first API call to the simulation service;
replacing, using the application simulation service framework, an identifier for a computing service with the simulation identifier for the simulation service in first application dependencies code of the first application, wherein a first execution of the first application dependencies code enables the first API call to the simulation service;
replacing, using the application simulation service framework, the identifier for the computing service with the simulation identifier for the simulation service in second application dependencies code of a second application, wherein a second execution of the second application dependencies code enables a second API call to the simulation service;
performing the second API call to the simulation service;
determining second response data to the second API call from the simulation service, wherein the second response data is associated with the simulation data for the simulation service; and
providing the second response data for the second application in an interface of the application simulation service framework.

18. The system of claim 17, wherein the operations further comprise:
performing the first API call to the simulation service; and
determining first response data to the first API call from the simulation service, wherein the first response data is associated with the simulation data for the simulation service.

19. The system of claim 18, wherein the operations further comprise at least one of storing the first response data in a repository database for application testing using the application simulation service framework or providing the first response data to the first application.

20. The system of claim 18, wherein the first API call is performed prior to the second API call, and wherein the providing the second response data further comprises providing the first response data with the second response data in the interface.

* * * * *